United States Patent
A

(10) Patent No.: US 10,846,344 B2
(45) Date of Patent: Nov. 24, 2020

(54) SYSTEMS AND METHODS FOR STORING AND RETRIEVING DATA IN A CONTENT MANAGEMENT SYSTEM

(71) Applicant: SAP SE, Walldorf (DE)

(72) Inventor: Malavikha A, Bangalore (IN)

(73) Assignee: SAP SE, Walldorf (DE)

( * ) Notice: Subject to any disclaimer, the term of this patent is extended or adjusted under 35 U.S.C. 154(b) by 317 days.

(21) Appl. No.: 15/825,696

(22) Filed: Nov. 29, 2017

(65) Prior Publication Data

US 2019/0163751 A1     May 30, 2019

(51) Int. Cl.
| | |
|---|---|
| *G06F 16/00* | (2019.01) |
| *G06F 16/93* | (2019.01) |
| *G06Q 30/00* | (2012.01) |
| *G06F 40/14* | (2020.01) |
| *G06F 40/197* | (2020.01) |

(52) U.S. Cl.
CPC .............. *G06F 16/93* (2019.01); *G06F 40/14* (2020.01); *G06F 40/197* (2020.01); *G06Q 30/016* (2013.01)

(58) Field of Classification Search
None
See application file for complete search history.

(56) References Cited

U.S. PATENT DOCUMENTS

| | | | |
|---|---|---|---|
| 2005/0071755 A1* | 3/2005 | Harrington | G06F 40/14 715/229 |
| 2007/0244935 A1* | 10/2007 | Cherkasov | G06F 16/1873 |
| 2013/0013604 A1* | 1/2013 | Kobayasi | G06F 17/2211 707/737 |
| 2017/0249323 A1* | 8/2017 | Truitt | G06F 16/93 |
| 2017/0286096 A1* | 10/2017 | Mathur | G06F 3/0482 |
| 2017/0351755 A1* | 12/2017 | Kumar | G06Q 10/10 |

OTHER PUBLICATIONS

AWS, "What is Pub/Sub Messaging", Jul. 17, 2017 (Year: 2017).*

* cited by examiner

*Primary Examiner* — Hung Q Pham
(74) *Attorney, Agent, or Firm* — Buckley, Maschoff & Talwalkar LLC

(57) ABSTRACT

Storing and retrieving data in a content management computer system. The method includes configuring the memory to store a document having a plurality of versions, according to a configuration comprising: (i) a plurality of topics, each topic being stored as an XML file and comprising content forming a portion of one or more of the versions of the document; and (ii) a plurality of project maps, each project map corresponding to one of the plurality of versions of the document and including a reference to one or more buildable maps, each buildable map including a reference to one or more of the topics, directly or through a submap. A publication request is received for a selected one of the project maps, and the referenced topics of the buildable maps of the selected project map are combined to form a version of the document corresponding to the selected project map.

20 Claims, 9 Drawing Sheets

```
<?xml version="1.0" encoding="UTF-8"?>
<!DOCTYPE map
PUBLIC "-//OASIS//DTD DITA Map//EN" "map.dtd">
<map>
    <title>The Project Gutenberg eBook of Twenty Thousand Leagues Under the Sea, by Jules Verne</title>
    <topichead navtitle="License Statement">
        <topicref href="legalstuff/main-page.xml"/>
    </topichead>
    <topicref href="chapters/d2e9.xml"/>
    <topicref href="chapters/contents.xml"/>
    <topicref href="chapters/introduction.xml"/>
    <topicref href="chapters/units-of-measure.xml"/>
    <topichead navtitle="FIRST PART" collection-type="sequence">
        <topicref href="chapters/d2e485.xml"/>
```

FIG.2A

```
<topic id="d2e485">
<title>
<ph class="h2">
<!-- 1.1 -->
Chapter 1
</ph>
<ph class="h3">A Runaway Reef</ph>
</title>
<body>
<p>
<ph outputclass=" size: +2">THE YEAR</ph>
1866 WAS MARKED BY A BIZARRE DEVELOPMENT, AN UNEXPLAINED AND DOWNRIGHT INEXPLICABLE PHENOMENON THAT SURELY NO ONE HAS FORGOTTEN. WITHOUT GETTING INTO THOSE RUMORS THAT UPSET CIVILIANS IN THE SEAPORTS AND DERANGED THE PUBLIC MIND EVEN FAR INLAND, IT MUST BE SAID THAT PROFESSIONAL SEAMEN WERE ESPECIALLY ALARMED. TRADERS, SHIPOWNERS, CAPTAINS OF VESSELS, SKIPPERS, AND MASTER MARINERS FROM EUROPE AND AMERICA, NAVAL OFFICERS FROM EVERY COUNTRY, AND AT THEIR HEELS THE VARIOUS NATIONAL GOVERNMENTS ON THESE TWO CONTINENTS, WERE ALL EXTREMELY DISTURBED BY THE BUSINESS.
</p>
<p>
IN ESSENCE, OVER A PERIOD OF TIME SEVERAL SHIPS HAD ENCOUNTERED "AN ENORMOUS THING" AT SEA, A LONG SPINDLE-SHAPED OBJECT, SOMETIMES GIVING OFF A PHOSPHORESCENT GLOW, INFINITELY BIGGER AND FASTER THAN ANY WHALE.
</p>
```

FIG.2B

FIRST PART

CHAPTER 1 A RUNAWAY REEF

THE YEAR 1866 WAS MARKED BY A BIZARRE DEVELOPMENT, AN UNEXPLAINED AND DOWNRIGHT INEXPLICABLE PHENOMENON THAT SURELY NO ONE HAS FORGOTTEN. WITHOUT GETTING INTO THOSE RUMORS THAT UPSET CIVILIANS IN THE SEAPORTS AND DERANGED THE PUBLIC MIND EVEN FAR INLAND, IT MUST BE SAID THAT PROFESSIONAL SEAMEN WERE ESPECIALLY ALARMED. TRADERS, SHIPOWNERS, CAPTAINS OF VESSELS, SKIPPERS, AND MASTER MARINERS FROM EUROPE AND AMERICA, NAVAL OFFICERS FROM EVERY COUNTRY, AND AT THEIR HEELS THE VARIOUS NATIONAL GOVERNMENTS ON THESE TWO CONTINENTS, WERE ALL EXTREMELY DISTURBED BY THE BUSINESS.

IN ESSENCE, OVER A PERIOD OF TIME SEVERAL SHIPS HAD ENCOUNTERED "AN ENORMOUS THING" AT SEA, A LONG SPINDLE-SHAPED OBJECT, SOMETIMES GIVING OFF A PHOSPHORESCENT GLOW, INFINITELY BIGGER AND FASTER THAN ANY WHALE.

FIG.2C

SYSTEMS AND METHODS FOR STORING AND RETRIEVING DATA IN A CONTENT MANAGEMENT SYSTEM

FIELD OF THE INVENTION

The disclosed embodiments are directed to storing and retrieving data in a content management computer system in which memory is configured to store components of multiple versions of a document in a virtual container space.

BACKGROUND

Complex products, such as software-based computer products, may require a product support function (e.g., personnel team) to provide specific advice to individual customers (i.e., users), as well as a user assistance function to produce and manage support documentation associated with the product. The user assistance team may receive "customer incidents" (i.e., customer queries and/or requests) from the product support team asking the user assistance team to modify documentation, provide more details about particular configurations and implementations described in the documentation, etc. The user assistance team may be limited by circumstances to providing very basic guidance for generic workflows, whereas actual customer product configurations may differ widely in scale, complexity, and nature. This may make it difficult to provide customers with effective assistance. Consequently, customers may turn solely to the product support team for detailed technical information relating to the customer's specific configuration. The product support team may, in turn, pass documentation-related issues to the user assistance team. This roundabout scenario may result in increased support costs, computer resources, and turnaround time to solve a customer's problem.

SUMMARY

In disclosed embodiments, the extensible markup language (XML) files that relate to all of the releases (i.e., versions) of a particular product will be stored in a homogenous, unsegregated system that will be, in effect, floating in a virtual container space. When an XML file is updated, the owner (e.g., the author) has the option to recall any version corresponding to any release, and update and re-release the same. This process avoids the need to "clone," i.e., copy, a container and reset a status of a "project" (i.e., the set of document components relating to a particular version of document). Once the update is published and visible on the various platforms (e.g., a support documentation server), the update may also be sent directly to users, e.g., through an RSS subscription model. The new/revised information may be categorized and differentiated on a user interface screen and may be available for use by any other customers, consultants, partners, etc. The update/revision may be presented with an overview of the scenario addressed by the update/revision. Hence all stakeholders with similar problem scenarios can: adapt the new methodology or procedure described; adjust it to suit their specific requirements; and comment and/or request further revisions.

In disclosed embodiments, the process of making revisions to support documentation based on user requests/incident reports may be improved by providing additional capabilities in a web page which hosts the documentation so that a user request is sent directly to an owner of, i.e., person responsible for, the content at issue. When a user encounters an issue with documentation or needs additional information about any features of the product (e.g., a software product), the user may provide a screenshot of their "landscape," which they can easily obtain using built-in functions to capture a screenshot or attach any existing landscape image that they may already have. These capabilities may be provided by a feature integrated with a portal where support documentation is published. The features may allow the user to state the problem description using predefined categories (e.g., need additional information, error in documentation, need information for higher complexity configuration, etc.). There may also be an option to provide any steps that the user (e.g., a consultant or system administrator) has already executed and which have failed to resolve the issue. Such a message request may be instantly delivered, e.g., via instant messaging and email. When the owner/author of the relevant document logs in, they may receive a request initiated by the user in the manner discussed above. After any necessary revisions are made to the documentation (which may be made in consultation with other personnel, e.g., a product expert) and published, the customer will be notified.

Embodiments disclosed herein empower the professionals responsible for the user assistance functions of an entity (e.g., a software product provider) to provide highly efficient, responsive, and timely revision of support documentation in direct response to user inquiries, as well as sending such revisions to the user contemporaneously. In such a case, there is no need for mediators in the process, such as the professionals responsible for the product support function. This, in turn, can allow for a significant reduction in the cost of user assistance and the time required of product support professionals in these functions. The product support professionals will therefore be able to focus on more pressing customer "escalations." In this way, the user assistance professionals can add more value to overall customer support, rather than merely complying with legal requirements to maintain adequate product documentation.

In one aspect, the disclosed embodiments are a method, and corresponding system and computer-readable medium, for storing and retrieving data in a content management computer system having at least one server with a memory, a processor, and a network interface. The method includes configuring the memory, using the processor, to store a document having a plurality of versions according to a configuration comprising: (i) a plurality of topics, each topic being stored as an XML file and comprising content forming a portion of one or more of the versions of the document; and (ii) a plurality of project maps, each project map corresponding to one of the plurality of versions of the document and including a reference to one or more buildable maps, each buildable map including a reference to one or more of the topics, directly or through a submap. The method further includes receiving a publication request for a selected one of the project maps. The method further includes combining the referenced topics of the buildable maps of the selected project map to form a version of the document corresponding to the selected project map. The method further includes outputting the formed version of the document to a document server.

The disclosed embodiments may include one or more of the following features.

The method may further include receiving a support request relating to one or more of the versions of the document; retrieving one or more topics to produce revised topics; and determining a subset of buildable maps which include references to the revised topics. Such embodiments may further include combining topics referenced by the subset of buildable maps to form one or more revised versions of the document; and outputting, via the network interface, the one or more revised versions of the document to a document server.

The support request may be received from a user via a support website or portal. The support request may identify one or more relevant versions of the document, and the support request may be sent to a designated owner of the one or more relevant versions of the document. The support request may be published to a publish/subscribe queue corresponding to the one or more relevant versions of the document, and the designated owner may receive the support request through a subscription to the queue corresponding to the one or more relevant versions of the document. The support request may identify one or more relevant topics, and the support request may be sent to a designated owner of the one or more relevant topics. The support request may be published to a publish/subscribe queue corresponding to the one or more relevant topics, and the designated owner may receive the support request through a subscription to the queue corresponding to the one or more relevant topics. The support request may be produced by tools included in a software product which is a subject of the support request. The tools may provide a feature to include one or more screenshots and/or status information relating to a condition and/or configuration of the software product.

BRIEF DESCRIPTION OF THE DRAWINGS

FIGS. 2A-2C depict document components in the form of XML files and a portion of a document formed by the publication of the components;

DETAILED DESCRIPTION

Figure 1:
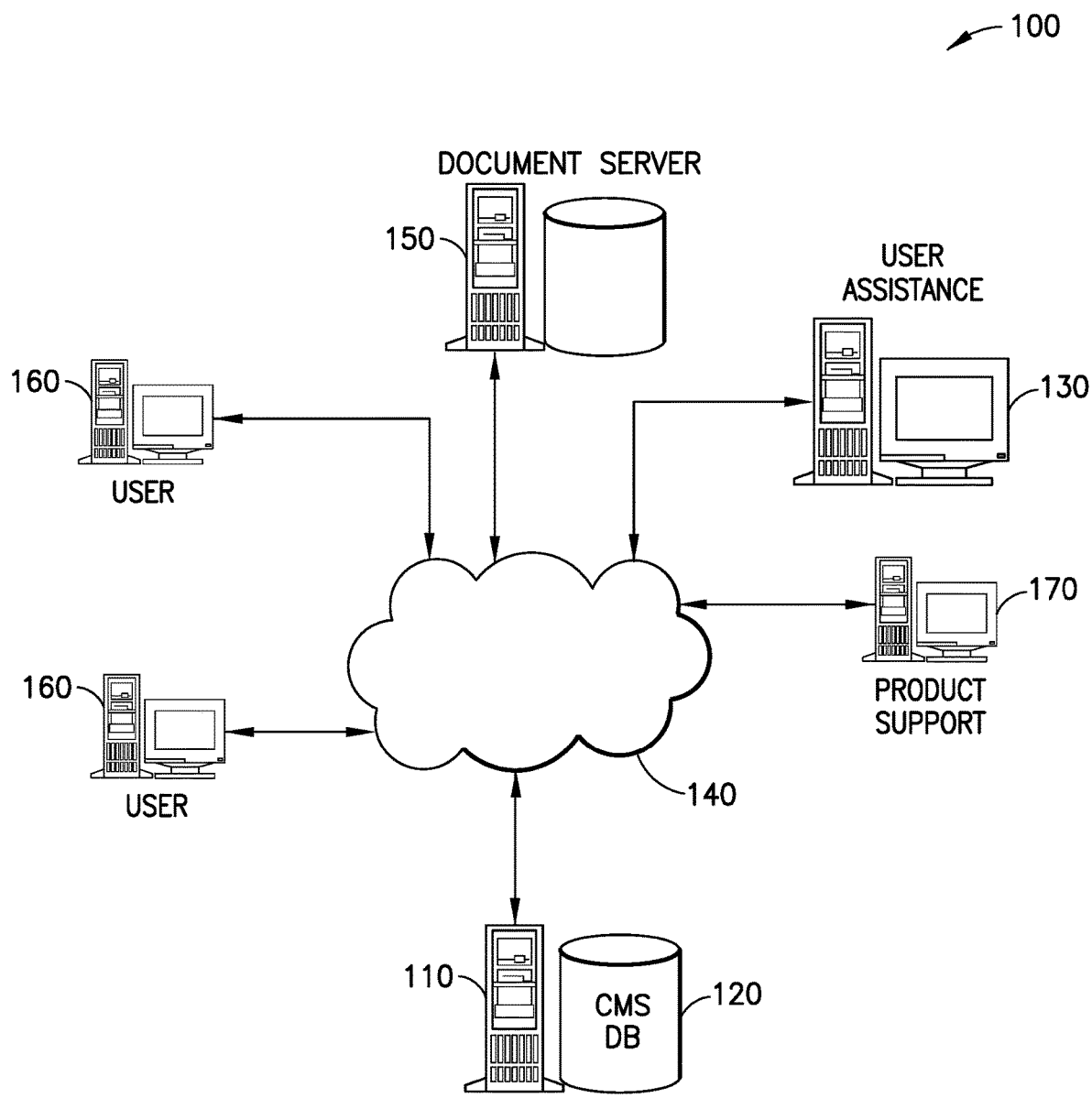
FIG. 1 is a block diagram of a system for storing and retrieving data from a content management system.

FIG. 1 is a block diagram of a system 100 for storing and retrieving content data from a content management system (CMS) 110. The content management system includes a database 120 which stores content, such as, for example, support documentation for software product users. The content is maintained by a document administrator, such as a user assistance team 130, which communicates with the CMS 110 via a communication network 140 (e.g., the internet) to manage the storage and retrieval of the content data. As explained in further detail below, the content handled by the CMS 110 may be compiled into documents and sent via the network 140 to a document server 150 (i.e., the documents may be "published" to the document server). The document server 150 (e.g., a support website or portal) is accessed by the users 160 (i.e., computing devices of the users) via the network 140 to retrieve specific documents which are relevant to the products they are using. The users 160 may also contact the user assistance 130 directly or through a product support team 170, as discussed in detail below.

In disclosed embodiments, the CMS 110 may use Darwin Information Typing Architecture (DITA), which is an open standard XML data model for authoring and publishing. DITA content is created as "topics," each topic being an individual XML file. The term "information typing" means that each topic has a defined primary objective and structure. Topics, or fragments of topics, can be reused across multiple publications. DITA may include, for example, five specialized topic types: task, concept, reference, glossary entry, and troubleshooting. Each of these five topic types is a specialization of a generic topic structure, which contains a title element, a prolog element for metadata, and a body element. The body element contains paragraph, table, and list elements, similar to hypertext markup language (HTML).

A "task" topic may be used to list a series of steps which are intended to be performed to produce a desired outcome. The steps are contained in a task body element, which is a specialization of the generic body element. The steps element is a specialization of an ordered list element. A "concept" topic may be used, e.g., for objective definitions, rules, and guidelines. A "reference" topic may be used, e.g., to describe command syntax, programming instructions, and other reference material, and usually contains detailed, factual material. A "glossary entry" topic may be used, e.g., for defining a term and providing any acronyms or acronym expansions that may apply to the term. A "troubleshooting" topic may be used to describe a technical error condition that a reader may want to correct, followed by one or more descriptions of its cause and suggested remedies.

A DITA "map" is a "container" for topics which is used to transform a set of topics into a publication (i.e., a document) by providing a sequence and structure for the topics. A map can include relationship tables ("reltables"), which define hyperlinks between topics. Maps can be nested, can reference topics or other maps, and can contain a variety of content types and metadata. DITA map and topic documents are XML files. As with HTML, any images, video files, or other files that are to appear in the output are inserted via reference.

FIGS. 2A-2C depict document components in the form of XML files and a portion of a document formed by the publication of the components. FIG. 2A shows an XML file which includes topic references for a number of document portions, such as a legal notice ("main-page.xml"), a table of contents ("contents.xml"), an introduction ("introduction.xml"), etc. The file also includes a reference to a topic identified as "d2e485" (see last line of code excerpt), which corresponds to the first chapter of the document. FIG. 2B shows an XML file which contains the topic identified as "d2e485". The file includes a chapter heading ("Chapter 1"), a sub heading ("A Runaway Reef"), and the text of two paragraphs of the document. FIG. 2C shows the a portion of the published document resulting from the files depicted in FIGS. 2A and 2B.

Figure 3:
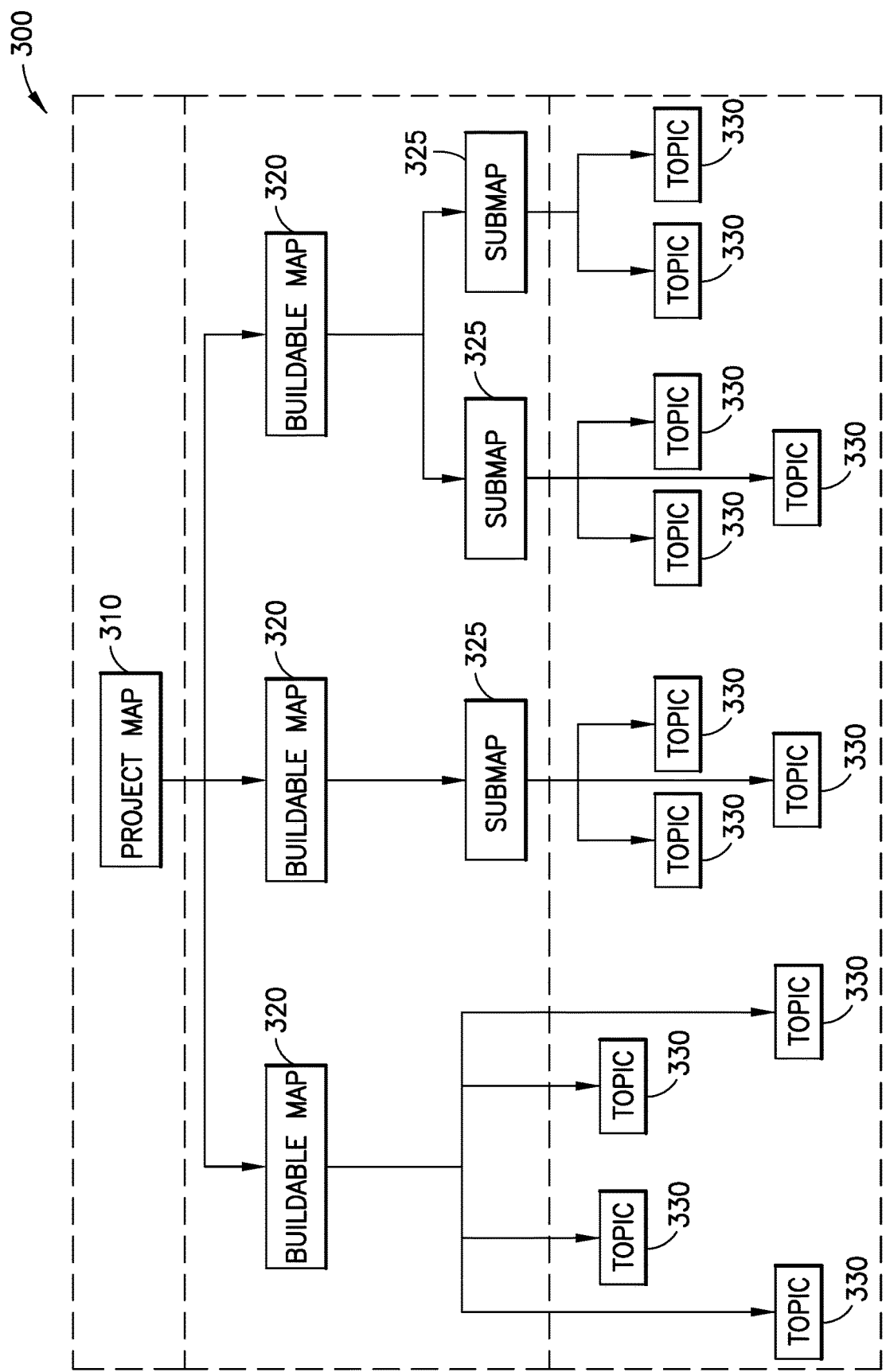
FIG. 3 is a block diagram depicting a project map referencing buildable maps, submaps and topics.

FIG. 3 is a block diagram depicting a project map referencing components of a document 300. The project map 310 contains references to a set of one or more buildable maps 320 which, when combined (if there is than one buildable map), form a particular document or version of a document (e.g., a technical support document for a specific version of a software product). The references allow the project map 310 to serve as a framework for combining the buildable maps 310 to form the document 300 (i.e., to "compile" or "build" the document). A document 300 may exist in numerous forms, such as, for example, a PDF file on a document server or as part of the built-in help documentation of a software product. In the latter case, the document 300 may be stored as a set of topic-like portions and selectively accessed during the operation of the software product based on user inquiries/searches.

The buildable maps 320, in turn, each contain references to one or more topics 330, e.g., DITA topics, such as tasks, concepts, references, etc. The buildable maps 320 may also contain references to one or more submaps 325 which, in turn, contain references to topics 330. The use of submaps 325 allows editing to be done at the same time on different portions of the document 300, because individual submaps 325 can be "locked" for editing of referenced topics 330 without locking the entire corresponding buildable map 320. The buildable maps 320 and submaps 325 form a framework for combining the topics 330 to form portions of the document 300. These portions of the document, when combined in accordance with the project map, form the whole document 300.

A project, i.e., the document 300 defined by a particular project map 310, may have a number of phases, i.e., modes. In a "planning" mode, content and a specific structure for the project may be under development. In an "active" mode, the content is stored in the content management system database and is periodically (e.g., nightly) subjected to a "build" process in which the content is compiled to form a document and pushed to the document server (i.e., sent to the document server via the network and made available to the owners and/or authors so that the content can be reviewed. Once the owners/authors are satisfied with the document, the project may be placed in "active translation" mode which allows the content to be accessed and translated into multiple languages. Following the translation process, the content is placed in a "done" mode (or status). In the done mode, the periodic builds are no longer performed. In particular embodiments, if further changes are needed after the content is placed in the done mode, it may be necessary to create a new project with a new project map.

Figure 4:
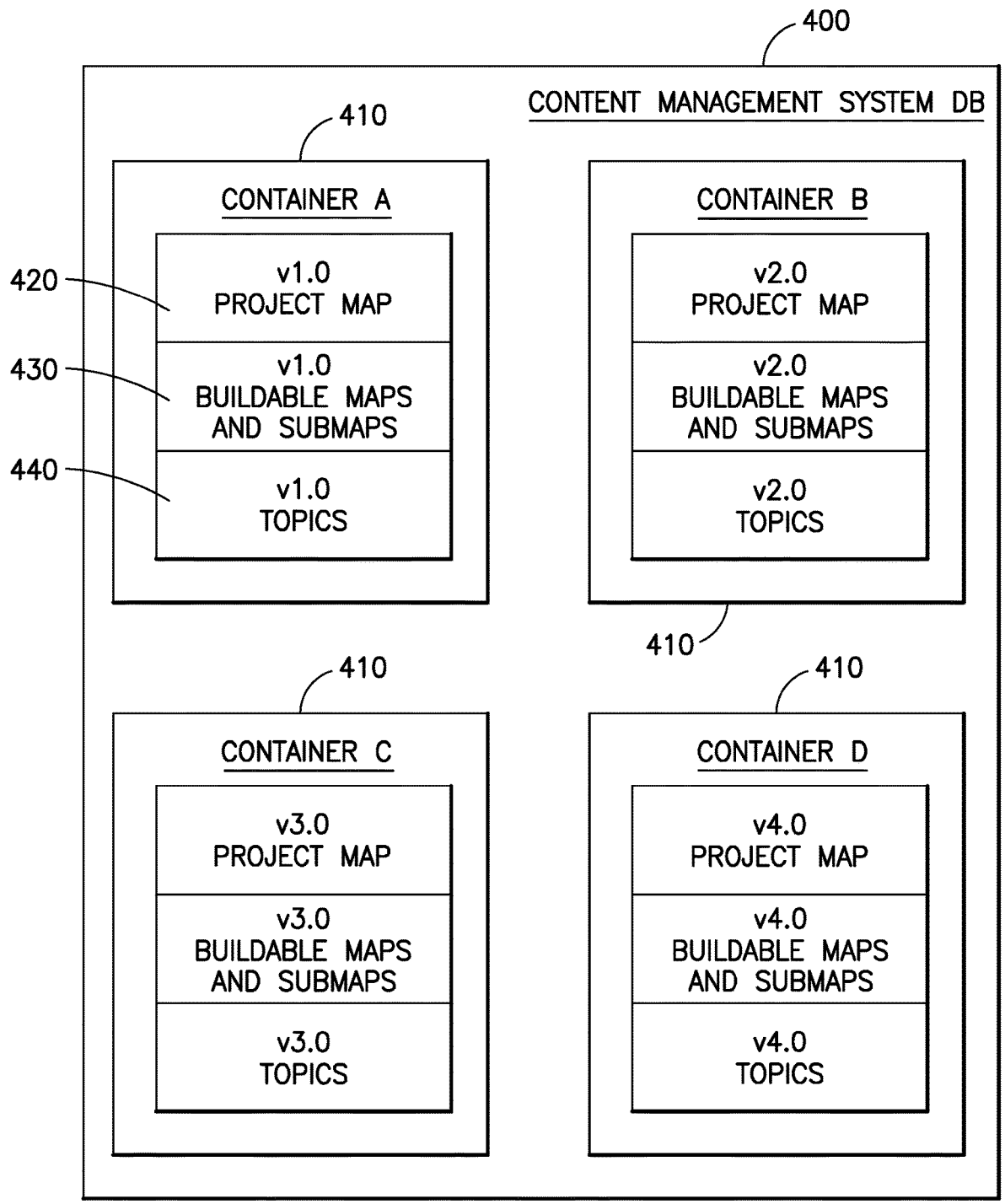
FIG. 4 is a block diagram of an embodiment of a content management system in which a project map, and associated buildable maps, submaps, and topics, for each version of a document are stored in separate container spaces.

FIG. 4 is a block diagram of an embodiment of a content management system in which a database 400 is configured to have a number of defined containers 410 for storing content. Each container 410 contains content relating to a particular document, such as, for example, a project map 420, buildable maps and submaps 430 referenced by the project map 420, and topics 440 referenced by the buildable maps and submaps 430. In disclosed embodiments, there may be multiple versions of a document, each of which is stored in a separate container. For example, containers A, B, C, and D may store, respectively, v1.0, v2.0, v3.0, and v4.0, of a document. As a further example, if the document is a technical support manual for a software product, then there may be a separate document version (and corresponding container) for each release version of the software product. The maps, submaps, and topics in each container relate to the corresponding version of the document/project map of the container. Therefore, the maps, submaps, and topics may be considered to have specific versions, even though there may be identical maps, submaps, and topics in more than one container.

In particular embodiments, it may be necessary to "clone" (i.e., copy) an entire container 410 to make revisions to the content stored therein. In such a case, the project map 420 and buildable maps/submaps 430 may be copied to the clone container, but individual topics 440 which are to be revised may have to be manually copied to the clone container. The topics are set to "done" mode before the cloning is performed to ensure that the topics are not in the process of being edited when they are copied. In some cases, a user may identify an error in a particular document version (e.g., a document for a particular software product version), but there may have been multiple intervening versions between the user's version and the current version. Thus, it may be necessary to clone the container holding the user's version of the document, the current version of the document, and all intervening versions. Significant processing resources may be required to run periodic builds and compile the revised documents.

Figure 5:
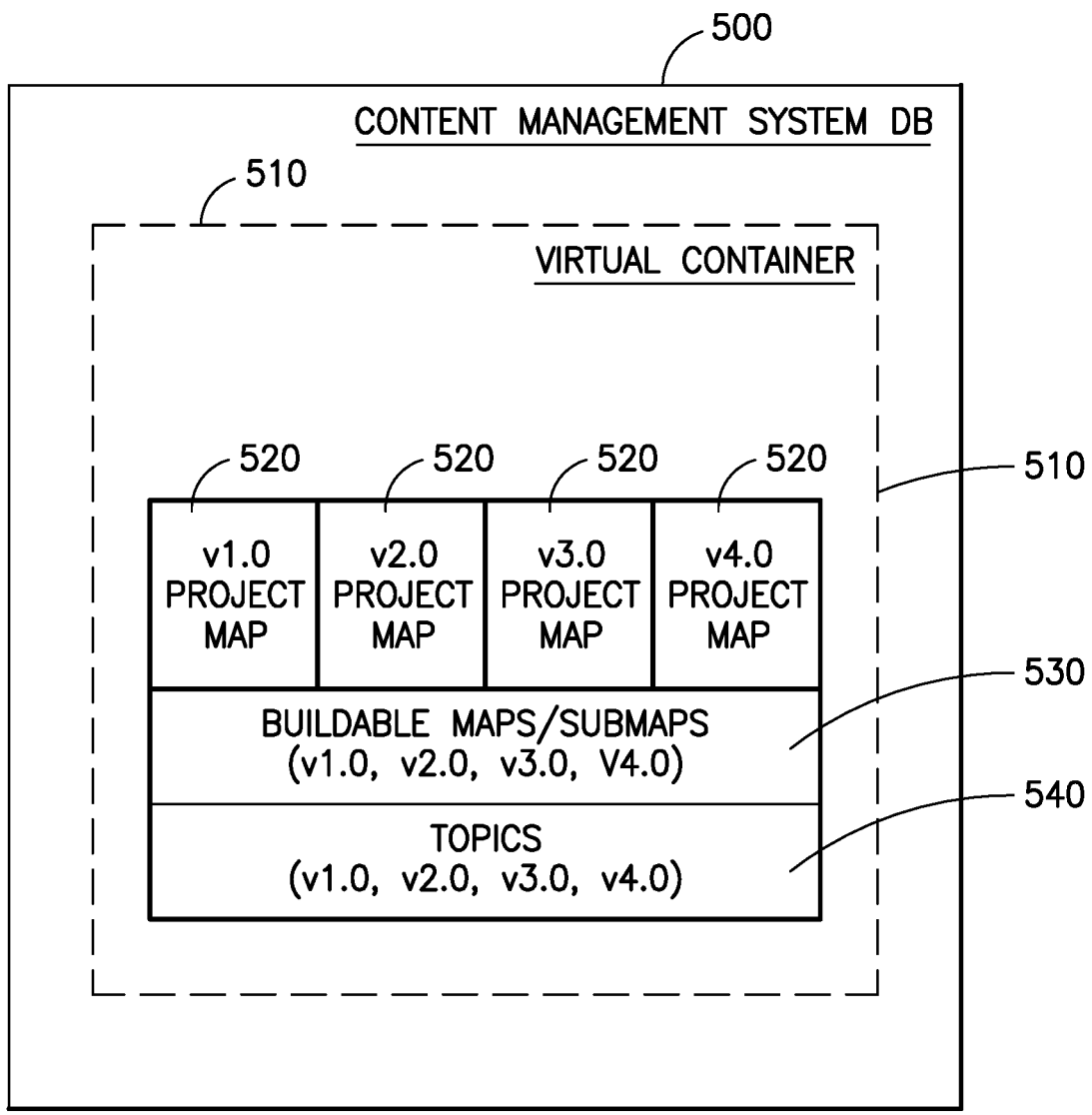
FIG. 5 is a block diagram of an embodiment of a content management system in which project maps, and associated buildable maps, submaps, and topics, for a number of versions of a document are stored together in a virtual container space.

FIG. 5 is a block diagram of an embodiment of a content management system in which a database 500 is configured to have a single virtual container space 510. The virtual container space 510 may contain project maps 520, and associated buildable maps/submaps 530, and topics 540, for a number of documents (and/or multiple versions of a document). In such a configuration, the maps/submaps 530 and topics 540 may be considered to be "floating" because any of the project maps 520 (e.g., v1.0, v2.0, etc.) can contain references to any of the map/submaps 530 and topics 540 in the virtual container space 510. Therefore, the virtual container space 510 can be considered to contain multiple versions of the maps/submaps 530 and topics 540 (e.g., v1.0, v2.0, etc.). Thus, there are no barriers between the project maps 510, buildable maps/submaps 530, and topics 540 of the multiple documents/versions. This means that a topic which is identical for all versions of a document need only have a single instance in the database which is referenced by the project maps of each version of the document.

By virtue of this configuration, in the event of an identified error in multiple versions of a document, it may be possible to revise only a single topic which is referenced by each of the multiple versions (i.e., the topic is identical in all of the multiple versions). This allows the revision to be propagated to all of the relevant versions without requiring each version of the document to be revised independently. In addition, it is not necessary to clone a separate container for each version to be revised (as might be required, for example, in a case in which the separate version containers are all marked "done" and therefore cannot be edited). Rather, in the configuration described above, the revision of multiple versions can be accomplished by creating one new container and adding a buildable map for each version to be revised. In such a case, the revised project need only be generated once. This, in turn, significantly reduces the necessary computing resources for the revision. Furthermore, this configuration of the content management system database allows for convenient sharing of content between documents/versions without requiring copying of files to create a duplicate for each version.

In disclosed embodiments, the topics may have an associated status, e.g., draft, translation, editing, done, etc. If, for example, a topic is set to "done," then the status may be changed to "emergency revise" so that revisions can be made. The content of the revised topic is then pushed (i.e., "published") to the document server and/or other designated destinations. Thus, it is not necessary to clone the components of a document to a create a separate instantiation to perform revisions, as in the embodiment of FIG. 4. The system may be configured to publish revised topics in "draft" mode so that the content can be reviewed and validated. The draft status can then be changed to "production," which means the content is available to users on the document server and/or various content platforms.

Figure 6:
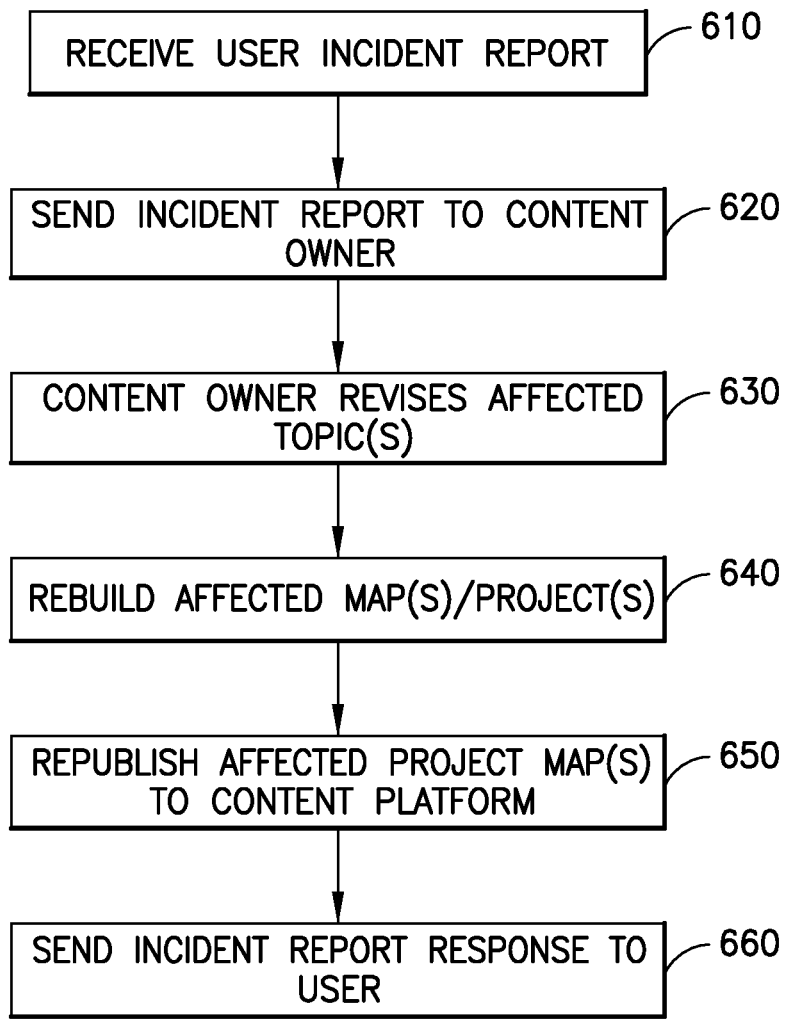
FIG. 6 is a flowchart of a method for revising and republishing documents in a content management system based on incident reports received from users.

FIG. 6 is a flowchart of a method for revising and republishing documents in a content management system (CMS) based on incident reports received from users. In disclosed embodiments, each of the documents, or document components (e.g., topics), stored in the CMS may have an associated owner (e.g., the content author) who is identifiable via a directory/map of content to corresponding content owners or metadata associated with the document components. When comments and/or inquiries are received from users relating to a specific element of content, the owner of the content is notified and receives the comments and/or inquiries directly, so that an appropriate response can be sent to the user. This direct notification of a content owner/author would be especially helpful, for example, in the case of software product deployment and installation guides.

Referring to FIG. 6, a user incident report relating to support documentation is received (610) from a user by a support website or "portal," e.g., a user assistance portal. For example, the user may access the support portal through the communication network using a browser or app running on the user's device. In disclosed embodiments, the user may access the support portal using tools which form part of the software product. These access methods may allow a user to incorporate one or more screen shots of the current condition of the user's device, as well as other operational and status information of the software product. Alternatively, the incident report may be received from an internal source, such as, for example, a referral based on a user interaction with a product support group. The report is sent to the designated owner (e.g., author) of the associated content (620). For example, the report may be sent using a publish/subscribe model in which incident reports are published to a queue and owners subscribe to the queue for all of the content for which they are the owner. The subscriptions may be created and/or managed by the content management system (CMS) or the document server. For example, the CMS may automatically designate an owner and establish a subscription to the owner as a topic is created in the CMS. The content owner revises the content identified in the incident report (630) and any other content affected by the issue (e.g., all topics/versions affected by the issue).

The buildable maps (and submaps) and project maps which contain references to revised content, e.g., topics, are rebuilt (640), using methods described above. For example, as noted in regard to FIG. 5, it may be the case that a number of buildable maps (and submaps) contain references to a topic which has been revised in response to the user incident report and, thus, are affected by the revision. These maps and submaps may, in turn, be referenced by one or more project maps (which may, for example, correspond to different versions of a document). The affected project maps are republished as documents on one or more content platforms (650), e.g., a document server. In addition to the republication of the documents, a separate notification (e.g., an email, text, or a notification by a software product) may be sent to the user who initiated the incident report (660). In this manner, the user can receive timely and direct information from the user assistance personnel who in charge of the support documentation.

Figure 7:
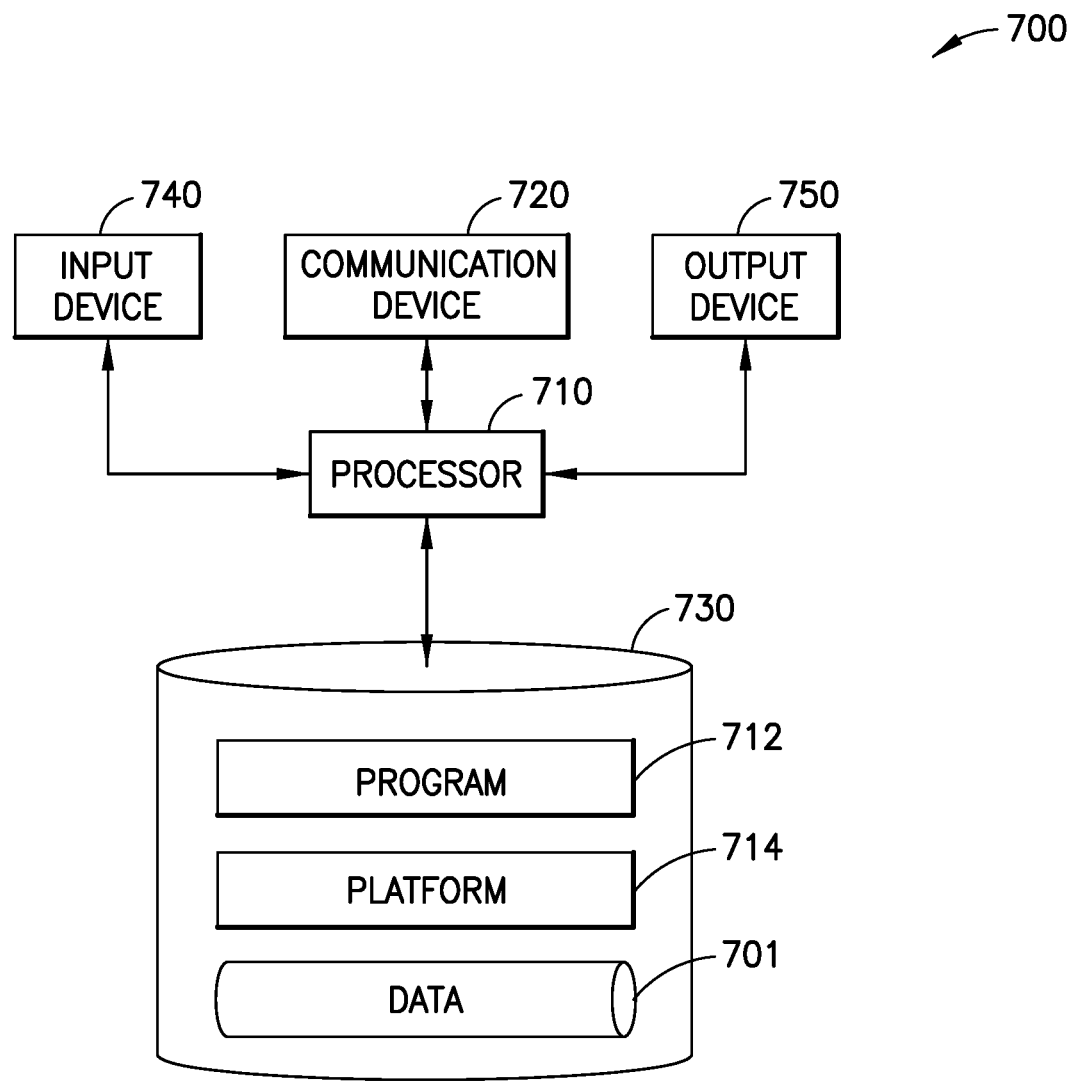
FIG. 7 is a block diagram of a system according to some embodiments.

FIG. 7 is a block diagram of apparatus 700 according to some embodiments. Apparatus 700 may comprise a general- or special-purpose computing apparatus and may execute program code to perform any of the functions described herein. Apparatus 700 may comprise an implementation of one or more elements of system 100. Apparatus 700 may include other elements which are not shown, according to some embodiments.

Apparatus 700 includes processor 710 operatively coupled to communication device 720, data storage device/memory 730, one or more input devices 740, and one or more output devices 750. Communication device 720 may facilitate communication with external devices, such as an application server. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to manipulate graphical user interfaces and to input information into apparatus 700. Output device(s) 750 may comprise, for example, a display (e.g., a display screen) a speaker, and/or a printer.

Data storage device/memory 730 may comprise any device, including combinations of magnetic storage devices (e.g., magnetic tape, hard disk drives and flash memory), optical storage devices, Read Only Memory (ROM) devices, Random Access Memory (RAM) etc. The storage device 730 stores a program 712 and/or platform logic 714 for controlling the processor 710. The processor 710 performs instructions of the programs 712, 714, and thereby operates in accordance with any of the embodiments described herein, including but not limited to the disclosed processes. The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method of storing and retrieving data in a content management computer system having at least one server with a memory, a processor, and a network interface, the method comprising:

configuring the memory, using the processor, to store a document having a plurality of versions, according to a configuration comprising:
- a plurality of topics, each topic being stored as an XML file and comprising content forming a portion of one or more of the plurality of versions of the document;
- a plurality of project maps, each project map uniquely corresponding to a single one of the plurality of versions of the document and including a reference to one or more buildable maps, each buildable map including a reference to one or more of the plurality of topics, directly or through a submap, and wherein each project map is a framework for combining buildable maps associated with the project map and wherein each project map forms a respective version of the document;

receiving, via the network interface, a publication request for a selected project map of the plurality of project maps;

combining, using the processor, corresponding topics referenced by corresponding buildable maps of the selected project map to form a version of the document corresponding to the selected project map; and outputting, via the network interface, the formed version of the document to a document server.

2. The method of claim 1, further comprising:
receiving a support request relating to one or more of the plurality of versions of the document;
retrieving one or more of the plurality of topics to produce revised topics;
determining a subset of buildable maps which include references to the revised topics;
combining topics referenced by the subset of buildable maps to form one or more revised versions of the document; and
outputting, via the network interface, the one or more revised versions of the document to a document server.

3. The method of claim 2, wherein the support request is received from a user via a support website or portal.

4. The method of claim 2, wherein the support request identifies one or more relevant versions of the document, and the support request is sent to a designated owner of the one or more relevant versions of the document.

5. The method of claim 4, wherein the support request is published to a publish/subscribe queue corresponding to the one or more relevant versions of the document and the designated owner receives the support request through a subscription to the queue corresponding to the one or more relevant versions of the document.

6. The method of claim 2, wherein the support request identifies one or more relevant topics, and the support request is sent to a designated owner of the one or more relevant topics.

7. The method of claim 6, wherein the support request is published to a publish/subscribe queue corresponding to the one or more relevant topics, and the designated owner receives the support request through a subscription to the queue corresponding to the one or more relevant topics.

8. The method of claim 2, wherein the support request is produced by tools included in a software product which is a subject of the support request, the tools providing a feature to include one or more screenshots and/or status information relating to a condition and/or configuration of the software product.

9. A system for storing and retrieving data in a content management computer system, the system comprising at least one server having a memory, a processor, and a network interface, said at one server being adapted to perform:
configuring the memory, using the processor, b store a document having a plurality of versions, according to a configuration comprising:
- a plurality of topics, each topic being stored as an XML file and comprising content forming a portion of one or more of the plurality of versions of the document;
- a plurality of project maps, each project map uniquely corresponding to a single one of the plurality of versions of the document and including a reference b one or more buildable maps, each buildable map including a reference to one or more of the plurality of topics, directly or through a submap, and wherein each project map is a framework for combining buildable maps associated with the project map and wherein each project map forms a respective version of the document;

receiving, via the network interface, a publication request for a selected project map of the plurality of project maps;

combining, using the processor, corresponding topics referenced by corresponding buildable maps of the selected project map to form a version of the document corresponding to the selected project map; and outputting, via the network interface, the formed version of the document to a document server.

10. The system of claim 9, wherein said at least one server is further adapted to perform:
receiving a support request relating to one or more of the plurality of versions of the document;
retrieving one or more of the plurality of topics to produce revised topics;
determining a subset of buildable maps which include references to the revised topics;
combining topics referenced by the subset of buildable maps to form one or more revised versions of the document; and
outputting, via the network interface, the one or more revised versions of the document to a document server.

11. The system of claim 10, wherein the support request identifies one or more relevant versions of the document, and the support request is sent to a designated owner of the one or more relevant versions of the document.

12. The system of claim 11, wherein the support request is published to a publish/subscribe queue corresponding to the one or more relevant versions of the document, and the designated owner receives the support request through a subscription to the queue corresponding to the one or more relevant versions of the document.

13. The system of claim 10, wherein the support request identifies one or more relevant topics, and the support request is sent to a designated owner of the one or more relevant topics.

14. The system of claim 13, wherein the support request is published to a publish/subscribe queue corresponding to the one or more relevant topics, and the designated owner receives the support request through a subscription to the queue corresponding to the one or more relevant topics.

15. The system of claim 10, wherein the support request is produced by tools included in a software product which is a subject of the support request, the tools providing a feature to include one or more screenshots and/or status information relating to a condition and/or configuration of the software product.

16. A non-transitory computer-readable medium storing program instructions executed by a processor of at least one server of a computer system, the server having a processor, memory, and a network interface, the medium comprising instructions for causing the processor to perform:
- configuring the memory, using the processor, by store a document having a plurality of versions, according to a configuration comprising:
  - a plurality of topics, each topic being stored as an XML file and comprising content forming a portion of one or more of the plurality of versions of the document;
  - a plurality of project maps, each project map uniquely corresponding to a single one of the plurality of versions of the document and including a reference to one or more buildable maps, each buildable map including a reference to one or more of the plurality of topics, directly or through a submap, and wherein each project map is a framework for combining buildable maps associated with the project map and wherein each project map forms a respective version of the document;
- receiving, via the network interface, a publication request for a selected project map of the plurality of project maps;
- combining, using the processor, corresponding topics referenced by corresponding buildable maps of the selected project map to form a version of the document corresponding to the selected project map; and
- outputting, via the network interface, the formed version of the document to a document server.

17. The non-transitory computer-readable medium of claim 16, medium further comprising instructions for causing the processor to perform:
- receiving a support request relating to one or more of the plurality of versions of the document;
- retrieving one or more of the plurality of topics to produce revised topics;
- determining a subset of buildable maps which include references to the revised topics;
- combining topics referenced by the subset of buildable maps to form one or more revised versions of the document; and
- outputting, via the network interface, the one or more revised versions of the document to a document server.

18. The non-transitory computer-readable medium of claim 17, wherein the support request identifies one or more relevant versions of the document, and the support request is sent to a designated owner of the one or more relevant versions of the document.

19. The non-transitory computer-readable medium of claim 17, wherein the support request identifies one or more relevant topics, and the support request is sent to a designated owner of the one or more relevant topics.

20. The non-transitory computer-readable medium of claim 17, wherein the support request is produced by tools included in a software product which is a subject of the support request, the tools providing a feature to include one or more screenshots and/or status information relating to a condition and/or configuration of the software product.

* * * * *